Oct. 11, 1938. P. A. HILLIARD 2,132,690
EDIBLE MATERIAL IN RIBBON FORM
Filed June 3, 1937
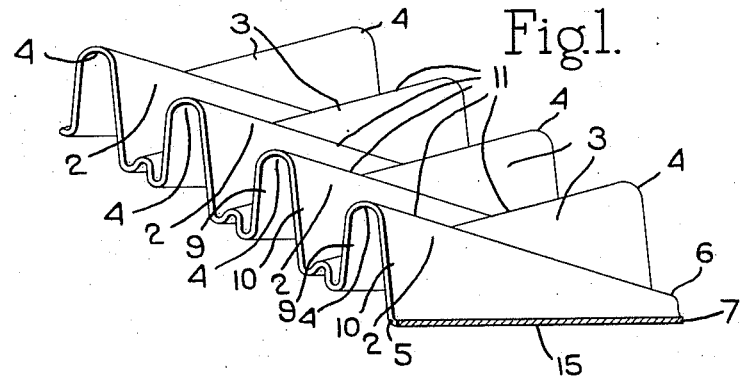
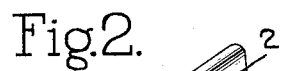
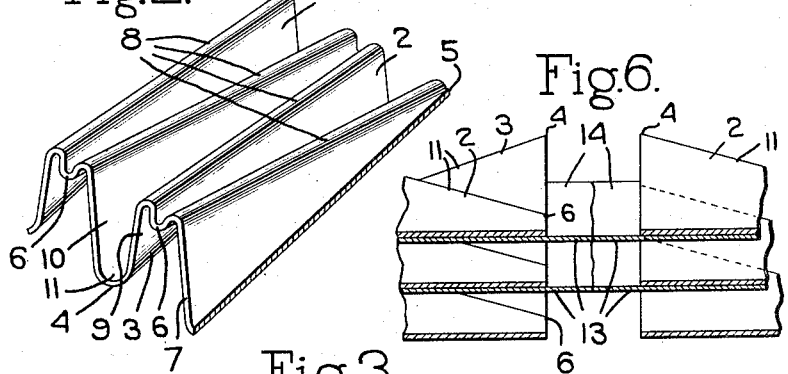
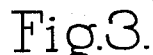
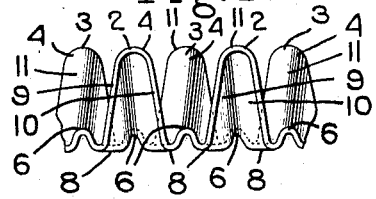
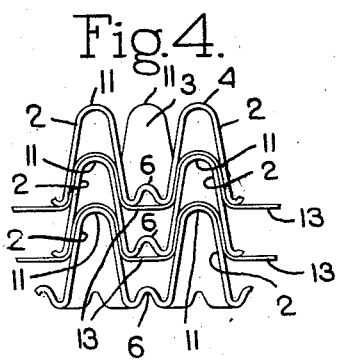
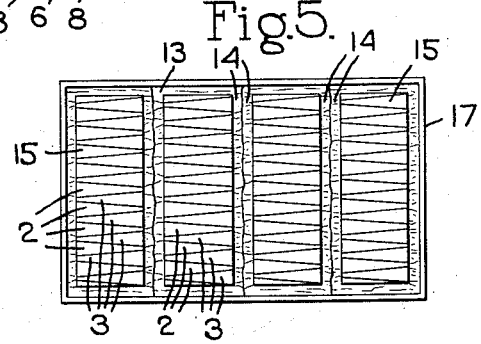
Inventor.
Perley A. Hilliard
by Heard Smith & Tennant.
Attys.

Patented Oct. 11, 1938

2,132,690

UNITED STATES PATENT OFFICE 2,132,690

EDIBLE MATERIAL IN RIBBON FORM

Perley A. Hilliard, Newtonville, Mass.

Application June 3, 1937, Serial No. 146,136

7 Claims. (Cl. 99—138)

This invention relates to edible material in ribbon form, of which ribbon candy is an example, although the invention is equally applicable to the manufacture of edible material such as crackers, cookies or the like.

Ribbon candy as now manufactured is quite fragile especially if the ribbon is relatively thin, and this makes it difficult to ship ribbon candy without breakage. In fact, manufacturers of ribbon candy do not usually expect to ship their candy any distance but instead usually plan to dispose of their ribbon candy locally.

It is one of the objects of my present invention to provide candy or other edible material in ribbon form, which is constructed so that the ribbon-shaped edible material can be safely packed and shipped without any special danger of breakage. In making my ribbon candy the candy material is rolled or spun out into the flat ribbon form as usual and then this ribbon is crimped to give the ribbon candy effect by forming therein folds which extend transversely of the ribbon, each fold being deeper at one edge of the ribbon than at the other. These folds, each of which has a progressively varying depth from one edge to the other of the ribbon, are arranged so that some of the folds have their deepest portion at one edge of the ribbon and the other folds have their deepest portions at the opposite edge of the ribbon. The folds are so made that two lengths of the ribbon candy embodying the invention can be nested together, and by placing a soft separating sheet of paper between the nesting layers it is possible to pack and ship the candy without any special danger of breakage.

In order to give an understanding of the invention I have illustrated in the drawing a selected embodiment thereof which will now be described after which the novel features will be pointed out in the appended claims.

In the drawing:

Fig. 1 is a fragmentary perspective view showing a strip of ribbon candy embodying my invention;

Fig. 2 is a fragmentary perspective view showing a portion of the ribbon turned upside down from the position shown in Fig. 1;

Fig. 3 is an edge view of a section of the ribbon candy;

Fig. 4 is a fragmnetary view showing how different strips of the ribbon candy may be nested together for packing;

Fig. 5 illustrates a box having the strips of ribbon candy packed therein;

Fig. 6 is a fragmentary view showing how the separating sheets serve to hold adjacent tiers of nested candy separated when the candy is packed in a box.

As stated above my invention is applicable not only to the manufacture of ribbon candy but also to the manufacture of other edible material such as cracker material or cookie material in ribbon form. For convenience, however, I will refer to the invention as applied to the making of ribbon candy, although I wish it understood that the reference herein to ribbon candy is not intended to limit the invention to the manufacture of candy or confection.

In making ribbon candy embodying the invention the candy material will first be rolled or spun out into flat ribbon form as usual and then the ribbon will be crimped transversely of its length so as to form folds 2, 3 extending transversely of the length of the ribbon. Each fold has a general U shape in cross section with the side walls of the fold converging toward each other in the direction of the bend of the U, and each fold is made deeper at one end than at the other so that each fold has a progressively varying depth from one edge of the ribbon to the other.

The various folds in the ribbon are so disposed that some of the folds, as, for instance, the folds 2, have their deeper portions 4 at one edge 5 of the ribbon and their shallowest portions 6 at the other edge 7 of the ribbon, while other folds, as, for instance, the folds 3, have their deeper portions 4 at the edge of the ribbon and their shallowest portions 6 at the edge 5 of the ribbon. The folds 2 and 3 may have any desired relative arrangement, but for the sake of symmetry I prefer to arrange them alternately as shown so that the alternate folds will be the folds 2 with the deeper portions 4 at the edge 5 of the ribbon and the other folds will be the folds 3 with the deeper portions at the edge 7 of the ribbon. In this way the folds have a sort of staggered relation and any two adjacent folds taper in opposite directions.

The ribbon is also so folded that the edges 8 of all the folds are in the same plane, and as a result when a length of the folded ribbon is laid on a table or other support with the edges 8 of the folds on the under side said length will rest flatly on the table or support.

The folds 2 and 3 are preferably so made that the sides 9, 10 of each fold converge slightly toward the apex or top 11 of the fold, and since the folds are thus open on the under side one length of the ribbon material may be superposed on another length in nesting relation as shown in Fig. 4 with the top or ridge 11 of each fold of the bottom layer nesting into a corresponding fold of the upper layer.

For shipping the candy I propose to pack several strips 15 of the ribbon candy in boxes with this nesting relation and will preferably use sheets of soft flexible paper 13 between the separate layers or strips. These sheets will also preferably extend slightly beyond the edges 5, 7 of the layers, as seen at 14 in Figs. 5 and 6, thereby forming a packing between the edges of the nested layers and the walls of the box, and between the edges of the tiers of nested layers which may be packed in any individual box. In Fig. 5 there is shown somewhat diagrammatically a box 17 in which a plurality of tiers of nested strips 15 are packed, and said figure shows how the projecting portions 14 of the packing paper serve to hold the tiers separated and thus prevent the adjacent tiers from contacting with each other when the box is shipped. When the ribbon candy is thus packed the nesting of the folds prevents the superposed ribbons from relative movement lengthwise, and the tapered shape of the folds prevents the nested ribbons from shifting relatively in a transverse direction so that the layers of candy in any tier of layers will be retained in position when packed in a box.

I find that candy made and packed in this way can be safely shipped without any special danger of breakage If desired, certain of the folds may be creased or indented along the ridge to make it easier to break the candy up into small lengths when it is removed from the box to be eaten.

As stated above, while I have referred to ribbon candy, yet ribbon material embodying the invention can also be made from other edible material such as that from which crackers or cookies and the like are made.

I claim:

1. Edible material in ribbon form with the ribbon structure having folds extending transversely thereof, each fold being deeper at one edge of the ribbon structure than at the other edge and the side walls of each fold converging toward each other from the open to the closed edge of said fold.

2. Edible material in ribbon form with the ribbon structure having folds extending transversely thereof, each fold being deeper at one edge of the ribbon structure than at the other edge and part of the folds having their deepest portion at one edge while the remainder of the folds have their deepest portion at the other edge.

3. Edible material in ribbon form with the ribbon structure having folds extending transversely thereof, each fold being deeper at one edge of the ribbon structure than at the other edge, the alternate folds having their deepest portion at one edge and the other folds having their deepest portion at the opposite edge.

4. Edible material in ribbon form with the ribbon structure having transverse folds U-shaped in cross section extending from one edge to the other thereof, each fold being deeper at one edge of the ribbon structure than at the other and all folds having their bottom edges in the same plane.

5. Edible material in ribbon form with the ribbon structure having transverse folds extending from one edge to the other thereof, the sides of each fold converging toward the apex thereof and each fold being deeper at one edge of the ribbon structure than at the other.

6. Edible material in ribbon form with the ribbon structure having folds extending transversely thereof, each fold having a progressively varying depth from one edge of the ribbon structure to the other edge thereof, and the adjacent folds having their deepest portions at opposite edges of said ribbon structure.

7. Edible material in ribbon form with the ribbon structure having folds extending transversely thereof, each fold having a progressively varying depth from one edge of the ribbon to the other and also having a progressively varying width from the open to the closed edge of the fold, some of the folds having their deepest portion at one edge of the ribbon structure and the remaining folds having their deepest portion at the opposite edge of said structure.

PERLEY A. HILLIARD.